C. P. GRONBERG.
Harvester Rake.
No. 29,966.
Patented Sept. 11, 1860.
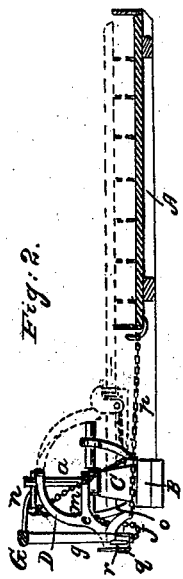
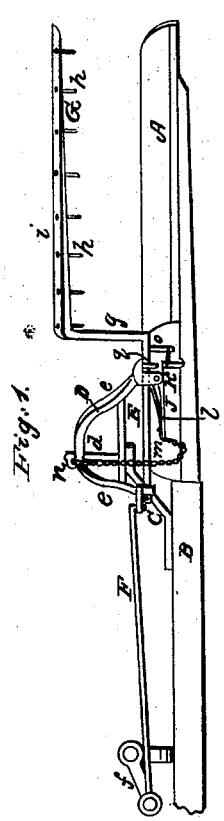
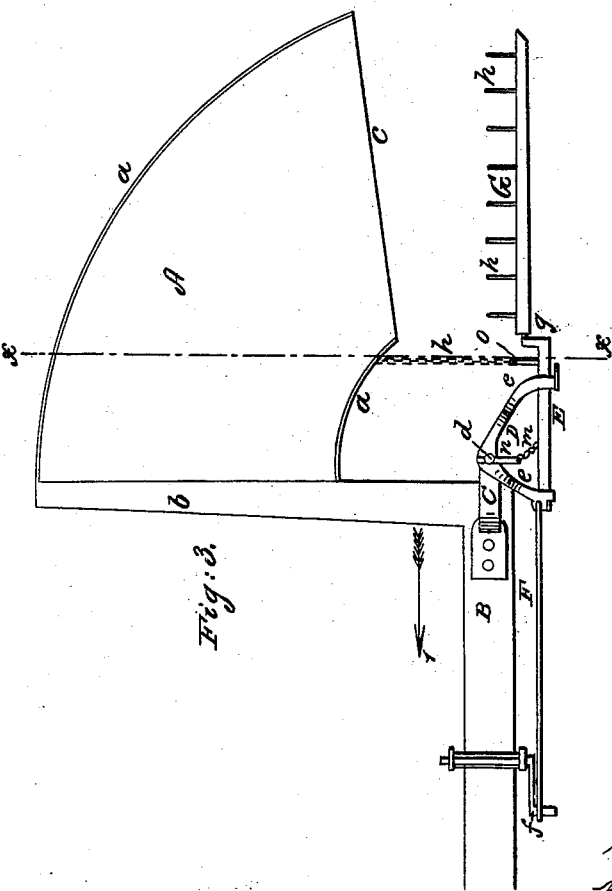

UNITED STATES PATENT OFFICE.

C. P. GRÖNBERG, OF AURORA, ILLINOIS.

IMPROVEMENT IN RAKING ATTACHMENTS FOR HARVESTERS.

Specification forming part of Letters Patent No. 29,966, dated September 11, 1860.

*To all whom it may concern:*

Be it known that I, C. P. GRÖNBERG, of Aurora, in the county of Kane and State of Illinois, have invented a new and Improved Raking Attachment for Harvesters; and I do hereby declare that the following is a full, clear, and exact description of the same, reference being had to the accompanying drawings, making a part of this specification, in which—

Figure 1 is a side view of the platform of a harvester with my invention applied to it; Fig. 2, a section of the same, taken in the line $x\ x$, Fig. 3; Fig. 3, a plan or top view of the same.

Similar letters of reference indicate corresponding parts in the several figures.

This invention relates to an improvement in that class of self-raking devices for harvesters in which the rake moves in the arc of a horizontal circle over the platform and has a rising and falling movement—a falling one at the rear of the platform, so as to work in close proximity to the latter while moving toward its front end, in order to rake the cut grain therefrom, and a rising one at the front part of the platform, so that the rake may pass above or over the grain on the platform to the back end thereof.

The object of the within-described invention is to obtain a simple and efficient means for giving the above-described movements to the rake, as hereinafter fully shown and described.

To enable those skilled in the art to fully understand and construct my invention, I will proceed to describe it.

A represents the platform of a harvester, which platform is of curved form, its sides $a\ a$ being segments of circles, as shown clearly in Fig. 3.

B is a portion of the framing of the harvester, to which framing the platform is attached.

$b$ is the front and $c$ the back end of the platform, the arrow 1, Fig. 3, indicating the draft movement of the implement.

On the back part of the framing B there is secured a support or arm, C, which has an upright pintle, $d$, attached to it. On this pintle there is fitted a small metal frame, D, composed chiefly of two arms, $e\ e$, so curved that their ends may form bearings for the rake-shaft E, which is allowed to turn freely in its bearings. The frame D is allowed to work freely on the pintle $d$ as a center, and the outer part of one of the arms $e$ is connected by a rod, F, to a crank, $f$, which may receive its motion through any proper means from the driving-wheel of the machine. The rake-shaft E is bent in crank form, as shown more particularly in Fig. 1, the bend $g$ being between the rake G and the nearest arm $e$.

The rake G may be of usual construction, being formed of a series of teeth, $h$, attached to a head, $i$. The rake is equal in length to the width of the platform A.

To the under side of the outer part of one of the arms $e$ a small lever, $j$, is attached by a fulcrum-pin, $k$, said lever $j$ having a spring, $l$, attached, which spring has a tendency to keep the short end of the lever thrown upward, the spring being attached to the longer part of the lever, as shown clearly in Fig. 1. To the end of the longer part of the lever $j$ there is a chain, $m$, attached, said chain being connected to a pin, $n$, which is fitted horizontally in the upper part of the pintle $d$.

To the rake-shaft E, at a point between the bent portion $g$ and the nearest arm $e$, there is an arm, $o$, attached, to the end of which a chain, $p$, is connected, said chain being also attached to the inner side of the platform A. To the rake-shaft E, at a point near the arm $o$, there is attached a projection, $q$. This projection is notched at its end, as shown clearly at $r$ in Fig. 2.

The operation is as follows: As the crank $f$ is rotated a vibrating movement is given the frame D on pintle $d$, and the rake G is thereby moved in the arc of a circle back and forth over the platform A. The rising and falling movements are given the rake as follows: Each time the rake reaches the termination of its backward stroke and rakes the cut grain off from the platform the chain $p$, in consequence of being attached to the arm $o$, causes the rake-shaft E to turn in its bearings, and the rake G is thereby elevated, and is retained in an elevated state in consequence of the notched end of the projection $q$ catching on the shorter end of lever $j$, as shown clearly in Fig. 2. The rake G is retained in this elevated state while passing over the platform to its front end, and just previous to the termination of said movement the chain $m$, by the movement of the rake-shaft, is made to draw upward the longer end of the lever $j$, and thereby releases the projection $q$ from the lever $j$, and the rake falls by its own gravity down on the front of the platform and its backward movement commences, the rake sweeping the cut grain off the back end of the platform, and then rising, as before, through the medium of the chain $p$ and arm $o$, preparatory to making its forward movement.

This device, it will be seen, is extremely simple and efficient, involving but little expense in construction and application, and there are no parts liable to get out of repair, and repairs may be readily made when necessary.

Having thus described my invention, what I claim as new, and desire to secure by Letters Patent, is—

The bent rake-shaft E, fitted in the vibrating frame D, in connection with the projection $q$ and chains $m\ p$, attached respectively to the lever $j$ and arm $o$, all being arranged for joint operation, as and for the purpose set forth.

C. P. GRÖNBERG.

Witnesses:
R. L. CARTER,
LYMAN BALDWIN.